United States Patent Office 3,371,130
Patented Feb. 27, 1968

3,371,130
ANTIELECTROSTATIC MOLDED BODIES
OF POLYOLEFINES
Friedrich Seifert, Fritz Baxmann, and Dieter Carla, Marl, Germany, assignors to Chemische Werke Huls Aktiengesellschaft, Marl, Germany, a corporation of Germany
No Drawing. Filed June 3, 1965, Ser. No. 461,203
Claims priority, application Germany, June 24, 1964, C 33,232
3 Claims. (Cl. 260—897)

It is known that products made from synthetic resins, especially polyolefines, will become highly charged electrostatically during storage or use even when subjected only lightly to friction, a property which lessens substantially the functional value of such products.

Attempts have been made to protect the synthetic resins from such charges by use of additives which have a destaticizing effect. British Patent No. 731,728 describes the admixture of .001 to .2% of alkalaryl polyglycol ether and Belgian Patent No. 536,623 discloses the admixture of .01 to .2% of an alkylpolyglycol monoether. In both cases the destaticizing protection is entirely insufficient, especially if the atmospheric humidity falls below 75%. The same holds true in each case of the addition of .5 to 1% of a fatty acid diethanolamine (British Patent No. 906,174) or a fatty acid dialkanolamine (U.S. Patent No. 2,992,199). Furthermore in the case of high-crystalline, high-isotactic materials higher percentages of additives are needed which however have the tendency to separate at the surface of the objects in the form of an oily layer. Such objects will have a destaticized property but will retain any dust settled on their surfaces because of the stickiness of the exuded additive. Finally, material containing a destaticizing agent which will migrate to the surface in a short period of time will lose this effect permanently after the first cleansing because the additive can be wiped or washed off with ease in the same manner as with articles that have been only surface treated thus leaving no additive to emerge from the inside to the surface.

It has been found that destaticized molded products made from polyolefines mixed with polyethyleneglycol monoethers and amides or amines of the type described below do not possess these disadvantages if they contain 2 to 7%, preferably 2.5 to 4% by weight, based on the polyolefine of a mixture of (a) 60 to 90% by weight of one or several polyethyleneglycolmonoalkylethers of the formula $R_1$—O—$(C_2H_4O)_xH$, wherein $R_1$ represents a saturated or unsaturated alkyl group with 6 to 18 carbon atoms, and $x$ represents a number ranging from 2 to 100, and/or of one or several polyethyleneglycolmonoaralalkylethers of the formula $R_2$—Ar—O—$(C_2H_4O)_xH$, wherein $R_2$ represents a saturated or unsaturated alkyl group with 1 to 18, preferably 6 to 18 carbon atoms, Ar represents an aromatic hydrocarbon residue, and $x$ represents a number ranging from 2 to 100 and (b) 10 to 40% by weight of a compound of the general formula

wherein $R_3$ represents an alkyl-, alkenyl- or acyl residue with 30 to 6, preferably 20 to 10, carbon atoms, $R_4$ represents a residue $(C_yH_{2y}O)_mH$ or $(CH_2 \cdot CHOH \cdot CH_2O)_nH$, and $R_5$ represents a residue $(C_yH_{2y}O)_mH$ or $$(CH_2 \cdot CHOH \cdot CH_2O)_nH$$

or hydrogen, in which formulae $y$ represents one of the whole numbers 2 or 3, $m$ represents a whole number from 1 to 30, and $n$ represents a whole number from 1 to 3.

Suitable polyolefines which will be destaticized by said additives are high or low-pressure polyethylenes with molecular weights ranging from 20,000 to 150,000 as well as polypropylenes with molecular weights ranging from 250,000 to 700,000 as well as mixed polymers and polymer mixtures thereof which may contain phenolic antioxidants, for example .1% by weight of 2,2-thiobis-(4-methyl-, 6-tert.-butyl-phenol) to serve as stabilizers. These mixtures are particularly suitable for high-crystalline, high-isotactic polypropylenes as well as their mixed polymers.

It was found that suitable polyethyleneglycolmonoalkyethers of the formula R—O—$(C_2H_4O)_xH$, wherein R represents a saturated or unsaturated alkyl group with 6 to 18 carbon atoms and $x$ represents a whole number from 2 to 100 can be produced by reacting ethylene oxide with aliphatic, saturated or unsaturated, alcohols having 6 to 18 carbon atoms, such as hexylalcohol, octylalcohol, stearyl or oleyl alcohol. The molar ratio can vary within wide limits e.g., between 2 and 300 mol of ethylene oxide per mol of alcohol. It was found that heptaethyleneglycol-monolaurylether is particularly suitable.

Suitable polyethyleneglycolmonoaralalkylethers of the formula $R_2$—Ar—O—$(C_2H_4O)_xH$, wherein $R_2$ represents a saturated or unsaturated alkyl group with 1 to 18, preferably 6 to 18 carbon atoms, Ar is an aromatic hydrocarbon residue and $x$ is a number from 2 to 100, may be obtained by ethoxyation of alkylphenols. The alkylphenols can be mono- or polynuclear and the alkyl residues therein, containing 1 to 18, preferably 6 to 18 carbon atoms, can be saturated or unsaturated. The alkylphenols are transformed by use of 2 to 100 mol of ethylene oxide into the polyethyleneglycolmonoaralalkylethers. Suitable are, for example, hexylphenyltriethyleneglycol, butylphenyldecaethyleneglycol, allylphenylpolyethyleneglycol-4000 (the number represents the mean molecular weight of the ethylene oxide chain), and methyl-β-naphthylhexaethyleneglycol. Nonylphenylheptaethyleneglycol has a particularly advantageous effect.

Suitable amides of the general formula

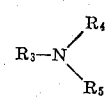

wherein $R_3$ represents an acyl residue with 30 to 6, preferably 20 to 10 carbon atoms, $R_4$ represents a residue $(C_yH_{2y}O)_mH$ or $(CH_2 \cdot CHOH \cdot CH_2O)_nH$ and $R_5$ represents a residue $(C_yH_{2y}O)_mH$ or $(CH_2 \cdot CHOH \cdot CH_2O)_nH$ or hydrogen, $y$ being one of the numbers 2 and 3, $m$ being a whole number from 1 to 30 and $n$ being a whole number from 1 to 3, are obtained by alkoxyation (ethoxyation or glycidation respectively) of acid amides of saturated or unsaturated carboxylic acids with 30 to 6, preferably 20 to 10 carbon atoms, or by the reaction of the acid chlorides with mono- or dialkanolamines, the number of any present of subsequently incorporated ethoxy groups per hydrogen atom of the unsubstituted amide residue being within the range from 1 to 30 and the number of the glycerine residues being from 1 to 3. Compounds of this type are, for example, lauric acid-N-diethyleneglycolamide, lauric acid-N-diethyleneglycol-, N-ethanolamide, capric acid-N-bis-diethyleneglycolamide and oleic acid diethanolamide.

Particularly suitable compounds are lauric and myristic acid diethanolamides.

Suitable amines are substances which satisfy the above given formula of the amides but with $R_3$ representing an alkyl- or alkenyl residue instead of an acyl residue. Such amines can be prepared from appropriate, above defined, basic amides by hydrogenation of the CO-group or by the Hofmann degradation process and ethoxyation or glycidation respectively, or can be obtained from the corresponding alcohol by way of the halogenalkane by reaction with mono- or dialkanolamides, the number of introduced ethoxy groups per hydrogen atom of the unsubstituted primary amine ranging from 1 to 30 and the number of the glycerine residues ranging from 1 to 3. Compounds of this type are for example hexadecyl-N-diethyleneglycol-, N-ethanolamine or octadecyl-N-bis-triethylene-glycolamine or heptadecyl-, N-glycerineglycidylamine. It was found that heptadecyl-diethanolamine is particularly suitable.

In principle the mixtures may comprise, in addition to and together with one each or several specific substances from the group of the polyethyleneglycolmonoalkyl- and/or arlkyethers, diverse amides and amines of the above described type. Outstandingly suitable destaticizers are mixtures of polyethyleneglycolmonoalkyl ether or polyethyleneglycolmonoaralkyl ether with the nitrogen compound claimed. Because of their still greater compatibility triple mixtures of the groups mentioned wherein monoalkyl- and monoaralkyl ethers can have any desired ratio in respect to each other are preferred.

The additions can be worked into the polyolefine, which can be processed most easily in pulverous form, by cold kneading followed by dry granulation. The individual components can be admixed to the polyolefine in any sequence desired. For the purpose of attaining a rapid, effective distribution the addition can be added also in diluted form by use of solvents which are then evaporated.

The additives can be incorporated into the polyolefine in quantities of 2 to 7% by weight without any danger of exudation. In order to attain an immediate and lasting destaticizing effect, even in case of high-isotactic, high-crystalline materials, additives ranging from 2.5 to 4% by weight are sufficient and suitable for all practical purposes.

The claimed additives are effective also in case of polyolefines which contain pigments, fillers, dyestuff, lubricants, plasticizers or stabilizers. In many instances the specific pigments, fillers and dyestuff will have an electrostatic influence on the polyolefine. However, this influence can be overcome with ease by a slight increase in the percentage of the claimed additive. This can be done without difficulty because even relatively large quantities, up to approximately 7%, will remain in the polyolefine without exuding. The destaticized polyolefine can be processed without difficulty by injection molding methods, especially at the temperatures ranging from 120 to 300° C. needed for the processing of the low-pressure polyethylene.

The destaticizing property of the above described additives is determined by a simple manual test which can be called a dust-particle test. The test result will be considered positive if the body under testing, after rubbing at a relative humidity of 50% and a temperature of 23° C., will not attract ashes which are at a distance of 1 cm. Especially important for proper evaluation is the humidity which is the primary determining factor of the electrostatic charge. If the humidity control is neglected, erroneous test results can be expected.

In the table there are compiled the tests on highisotactic, high-crystalline polypropylenes of a reduced specific viscosity from 2 to 5 (measured in p-xylene at $C=.1$ and 110° C.). In Example 10 there are shown low pressure polyethylenes with reduced specific viscosities ranging from 1.2 to 2.6 and densities between .96 and .94. Test 1 is used as control with no addition to the polypropylene, Tests 2 to 5 show various additons of ingredients of the mixture claimed, and Tests 6 to 10 finally show compositions in accord with the mixtures claimed. The table gives the results of the dust-particle test as well as the data of the surface resistivity in accordance with "DIN 53482" and particulars of the dying-out time of the charge produced by rubbing with a cotton cloth, of the tested object, suspended within a grounded holding device, measured by the field intensity apparatus proposed by Schwenkhagen (described in Textilpraxis 12/11, p. 1147, 1957). Also given in the table are the most important manufacturing details.

The test results prove that the high surface resistivity (Test 1) can be reduced in many instances by adding to the polypropylene only a polyethyleneglycolmonoalkyl- or -monoaralkylether or an amide or amine of the above described types (Tests 2 to 4), but this will impair and lower the workability, surface characteristics and mechanical properties of the molded objects. The combined employment of polyethyleneglycolmonoalkyl- and -monoaralkylethers will permit use of lesser percentages than are needed in case of individual ingredients but still fails to satisfy all requirements in mechanical respect (Test 5). Only the additional coemployment of an amide or amine in the double-mixture listed (Tests 6 and 7) results in the necessary decisive improvement concerning the undesired white fracture and permits a further reduction in the quantity which needs to be added and in spite of such reduction the destaticizing properties are being improved, especially in case of the triple combinations (Tests 8 to 10). In particular it is surprising that the exudation phenomena which are so troublesome in connection with amines and amides and which lead to sticky surfaces of finished articles (Test 4) have disappeared. This specific characteristic is defined herein as "controlled incompatibility," the meaning being that the added material acts in the most desirable manner within the synthetic material. It is "incompatible" to the extent that it can have a destaticizing effect but is "compatible" on the other hand in that it will not impair the other characteristics of the synthetic material.

It is possible just as advantageously as proved by the tests on the polypropylenes of the reduced specific viscosities ranging from 2 to 5 to destaticize the following resins: high- and low-pressure polyethylenes, that is, polyethylenes with densities ranging from .916 to .962 (see Test 10), polybutene-1 as well as ethylene-propylene- or ethylene-butylene copolymers as well as polymer mixtures of the single components of the above-described type.

Fully comparable results are attained for example if the laurylheptaethyleneglycol is replaced by butylpolyethyleneclycol-400, the nonylphenylheptaethyleneglycol by butyl- or hexylphenylpolyethyleneglycol-1550, and so on (the numbers 4000 and 1550 representing the molecular weight of the attached ethylene chain) the lauric acid diethanolamide by capric acid-, N-bis-diethyleneglycolamide or myristic- or oleic acid mono- or -diethanolamide, and the heptadecyldiethanolamine by dodecyl-, N-glycerineglycidylamine or dodecylmono- or -diethanolamine.

TABLE

| Example | Surface Resistivity in Megohm at 50% Humidity and 23° C. | Dying Out of Charge at 50% Hum. and 23° C. | Dust Particle Test | |
|---|---|---|---|---|
| 1. Polyprolylene (control) | $10^7$ | Slow | − | Suitable for the production of natural or dyed molded masses made by injection and extrusion methods for the manufacture of broad slot and flat foils as well as molded sheets. |
| 2. +3–5% by weight of laurylheptaethyleneglycol. | $10^5$ | Borderline between quick and slow. | + | Remarks: The admixtures in this magnitude necessary to attain a destaticizing effect will influence greatly the flow characteristics, will cause striae formation within the material and increased white fracture. |
| 3. +3–5% by weight of nonylphenylheptaethyleneglycol. | $10^5$ | ----do---- | + | Remarks: The admixtures in this magnitude necessary to attain a destaticizing effect will influence greatly the flow characteristics, cause striae formation within the material, lower the color coefficient and increase white fracture. |
| 4a. +.2–.9% by weight of lauric acid diethanolamide or heptadecyldiethanolamine. | $10^6$ | Slow | − | Remarks: Destaticizer insufficient. |
| 4b. +1–4% by weight of lauric acid diethanolamide or heptadecylidiethanolamine. | $5.10^3$ | Very quick | + | Remarks: The admixtures in this magnitude necessary to attain a destaticizing effect will influence greatly the flow characteristics, cause lowering of the color coefficient and intensive browning at higher temperatures, and lead to very sticky surfaces. |
| 5. +1.5–2% by weight of laurylheptaethyleneglycol and 1.5 to 2% by weight of nonylphenylheptaethyleneglycol. | $5.10^4$ | Quick | + | Suitable for the production of natural as well as dyed destaticized molded masses made by the injection and extrusion molding methods for the manufacture of broad slot and flat foils as well as molded sheets. Remarks: The masses have satisfactory flow characteristics and smooth, glossy surfaces which are not sticky; however, the white fracture is greater than in case of the control test 1. |
| 6. +2–3% by weight of laurylheptaethyleneglycol and 1 to .3% by weight of lauric acid diethanolamide or heptadecyldiethanolamine. | $10^4$ | ----do---- | + | Suitable for the production of natural color as well as dyed destaticized molded masses made by the injection and extrusion molding methods for the manufacture of broad slot and flat foils as well as molded sheets. Remarks: the masses have satisfactory flow characteristics and the articles made therefrom have smooth, glossy and non sticky surfaces and reduced white fracture in comparison with tests 2, 3 and 5 and compared with test 4 adjustable i.e. controlled incompatibility. |
| 7. +2–3% by weight of nonylphenyl-heptaethylene-glycol and 1 to .3% by weight of lauric acid diethanolamide or hepta-decyldiethanolamine | $5.10^3$ | ----do---- | + | Suitable for the production of primarily dyed destaticized molded masses made by the injection and extrusion methods for the manufacture of broad-slot-and flat foils as well as molded sheets. REMARKS: The masses have satisfactory flow characteristics and the articles made therefrom have smooth, glossy and non-sticky surfaces and reduced white fracture in comparison with tests, 2, 3 and 5. The color coefficient, especially in case of natural color material, is slightly impaired in comparison with control test 1. |
| 8. +1–1.4% by weight of laurylheptaethyleneglycol and 1 to 1.4% by weight of nonylphenyl-heptaethylene glycol and .3 to 1% by weight of heptadecyldiethanolamine or lauric acid diethanolamide | $5.10^3$ | Very quick (transfer this corrected line to the above "Remarks") | + | Suitable for the production of natural color as well as dyed destaticized molded masses made by the injection and extrusion molding methods for the manufacture of broad-slot-and flat foils as well as molded sheets. Remarks: The masses have satisfactory flow characteristics and the articles made therfrom have smooth, glossy, striae-free, non-sticky surfaces, and reduced white fracture, and compared with 4—controlled incompatibility. |
| 9. +1–1.4% by weight of butylpolyethyleneglycol-4000 and 1–1.4% by weight of hexylphenylpentaethyleneglycol and 1–.3% by weight of oleic acid ethanolamide or hexadecyl-, N-glycerine-glycidylamine | $5.10^3$ | ----do---- | + | Suitable for the production of natural color as well as dyed destaticized molded masses made by the injection and extrusion molding methods for the manufacture of broad-slot-and flat foils as well as molded sheets. Remarks: The masses have satisfactory flow characteristics, and the articles made therefrom have smooth, glossy, striae-free, non-sticky surfaces, reduced white fracture, and compared with test 4—controlled incompatibility. |

TABLE—Continued

| Example | Surface Resistivity in Megohm at 50% Humidity and 23° C. | Dying Out of Charge at 50% Hum. and 23° C. | Dust Particle Test | |
|---|---|---|---|---|
| 0. Low pressure polyethylene +.8–1.4% by weight of laurylpolyethyleneglycol-1550 and .8–1.4% by weight of nonylphenylhepta decaethyleneglycol and 1.0–.3% by weight of oleic acid diethanolamide or dodecyldiethanolamine | $10^3$ | ----do---------------- | + | Suitable for the production of natural color as well as dyed destaticized molded masses made by the injection and extrusion molding methods for the manufacture of broad-slot-and flat foils as well as molded sheets.<br>Remarks: The masses have satisfactory flow characteristics, and the articles made therefrom have smooth, glossy, striae-free, non-sticky surfaces, reduced white fracture, and compared with test 4—controlled incompatibility. |

The meaning of the terms:
  Slow—Half-life time of the charge is greater than 6 minutes.
  Quick—Half-life time of the charge reduced by a multiple is between 1 and 2 minutes.
  Very quick—Half-life time is 30 seconds or less.

1. A destaticized molded product consisting essentially of a polyolefine with an addition of 2 to 7% by weight relative to the polyolefine of a mixture consisting of (a) 60 to 90% by weight of at least one member selected from the group consisting of polyethyleneglycolmonoalkylethers of the formula R—O—$(C_2H_4O)_xH$, wherein R represents a member selected from the group consisting of saturated and unsaturated alkyl groups with 6 to 28 carbon atoms, and $x$ represents a whole number from 2 to 100, and polyethyleneglycolmonoaralkylethers of the formula $R_2$—Ar—O—$(C_2H_4O)_xH$, wherein $R_2$ represents a member selected from the group consisting of saturated and unsaturated alkyl groups with 1 to 18, Ar represents an aromatic hydrocarbon residue and $x$ represents a whole number from 2 to 100, and (b) 10 to 40% by weight of a compound of the general formula

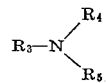

wherein $R_3$ represents a member selected from the group consisting of alkyl-, alkenyl- and acyl residues with 30 to 6 carbon atoms, $R_4$ represents a member selected from the group consisting of residues of the formulae

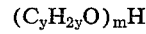

and $(CH_2 \cdot CHOH \cdot CH_2O)_nH$ and $R_5$ represents a member selected from the group consisting of residues of the formulae $(C_yH_{2y}O)_mH$ and $(CH_2 \cdot CHOH \cdot CH_2O)_nH$ and hydrogen, in which $y$ represents a whole number from 2 to 3, $m$ represents a whole number from 1 to 30, and $n$ represents a whole number from 1 to 3.

2. A destaticized molded product as defined in claim 1 in which the polyolefine is a member selected from the group consisting of high and low pressure polyethylenes having molecular weights within the range from 20,000 to 150,000, polypropylenes having molecular weights within the range from 250,000 to 700,000 and mixed polymers and polymer mixtures thereof.

3. A destaticized molded article as defined in claim 2 in which said addition is within the range from 2.5 to 4%, $R_2$ represents an alkyl group containing from 6 to 18 carbon atoms and $R_3$ represents a residue containing from 20 to 10 carbon atoms.

References Cited

UNITED STATES PATENTS 3,025,257  3/1962  Coler _____ 260—94.96

FOREIGN PATENTS 731,728  6/1955  Great Britain.

JOSEPH L. SCHOFER, *Primary Examiner.*

L. EDELMAN, *Assistant Examiner.*